United States Patent
Chen

(10) Patent No.: US 11,816,860 B2
(45) Date of Patent: Nov. 14, 2023

(54) DETECTION DEVICE FOR DETECTING HUMAN-BODY ORIENTATION AND DETECTION METHOD FOR DETECTING HUMAN-BODY ORIENTATION

(71) Applicant: Wistron Corp., New Taipei (TW)

(72) Inventor: Yen Yu Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 122 days.

(21) Appl. No.: 17/373,681

(22) Filed: Jul. 12, 2021

(65) Prior Publication Data
US 2022/0351408 A1    Nov. 3, 2022

(30) Foreign Application Priority Data

Apr. 28, 2021    (TW) .................................. 110115222

(51) Int. Cl.
| | |
|---|---|
| *G06T 7/73* | (2017.01) |
| *G06T 11/60* | (2006.01) |
| *G06N 3/084* | (2023.01) |
| *G06V 10/26* | (2022.01) |
| *G06V 40/16* | (2022.01) |

(52) U.S. Cl.
CPC ............... *G06T 7/73* (2017.01); *G06N 3/084* (2013.01); *G06T 11/60* (2013.01); *G06V 10/267* (2022.01); *G06V 40/161* (2022.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2011/0069159 A1* | 3/2011 | Soler | A61B 90/36 |
| | | | 348/E7.085 |
| 2021/0233301 A1* | 7/2021 | Ovadia | A61B 6/487 |
| 2022/0121839 A1* | 4/2022 | Tagra | G06V 40/171 |

FOREIGN PATENT DOCUMENTS

| | | |
|---|---|---|
| CN | 112164091 A | 1/2021 |
| CN | 112258275 A | 1/2021 |

(Continued)

OTHER PUBLICATIONS

Ke Sun et al., "Deep High-Resolution Representation Learning for Human Pose Estimation", Feb. 25, 2019, 12 pages, Microsoft Research, US.

(Continued)

*Primary Examiner* — Yanna Wu

(57) ABSTRACT

A detection device for detecting human-body orientation includes a camera and a processing device. The camera is configured to capture a human-body image. The processing device is configured to cut a human head contour image in the human-body image to obtain an input image, and input the input image to a classifier. The classifier outputs a plurality of human-body orientation probabilities for the input image. The processing device finds the highest human-body orientation probability, and determines whether the highest human-body orientation probability is above the accuracy threshold. In response to the highest human-body orientation probability being above the accuracy threshold, the processing device regards the human-body orientation corresponding to the highest human-body orientation probability as the determined human-body orientation.

18 Claims, 8 Drawing Sheets

(56) References Cited

FOREIGN PATENT DOCUMENTS

| | | |
|---|---|---|
| JP | 2005-202653 A | 7/2005 |
| JP | 2006-304331 A | 11/2006 |
| JP | 2016-001447 A | 1/2016 |
| TW | M537277 U | 2/2017 |
| WO | WO 2020/0065790 A | 4/2020 |

OTHER PUBLICATIONS

Yu-Hung Lai, "Image-Based Human Pose Recognition", Oct. 2009, 59 pages, R.O.C Taiwan.
Jian Liang Lin, "Detecting People and Their Pose", 2006, 51 pages, National Center Library, R.O.C Taiwan.

* cited by examiner

DETECTION DEVICE FOR DETECTING HUMAN-BODY ORIENTATION AND DETECTION METHOD FOR DETECTING HUMAN-BODY ORIENTATION

CROSS REFERENCE TO RELATED APPLICATIONS

This Application claims priority of Taiwan Patent Application No. 110115222, filed on Apr. 28, 2021, the entirety of which is incorporated by reference herein.

BACKGROUND OF THE INVENTION

Field of the Invention

The present disclosure relates to a human-body orientation detection device and a human-body orientation detection method and, in particular, to a human-body orientation detection device and a human-body orientation detection method suitable for a smart full-length mirror.

Description of the Related Art

A smart full-length mirror uses real-time virtual interaction to allow users to select clothes to try on virtually in front of the mirror. When the camera on the smart full-length mirror detects the presence of user, the full-length mirror's display can promptly capture an image. When displayed, the smart full-length mirror applies the virtual clothes selected by the user to the user in the display screen.

A home-type smart full-length mirror can combine the convenience of online shopping with the shopping experience in a physical store. On the other hand, smart full-length mirrors, advertising billboards, and interactive devices can also be placed in shopping malls to allow users to experience products or to use related services. For example, using a smart full-length mirror, a user can see what he/she would look like wearing the selected apparel. However, when the user uses a smart full-length mirror or another, similar interactive device, it often happens that the body is sideways, but the face is facing the front of the mirror in order to see the appearance of the clothes on the body. At this time, if the smart full-length mirror does not have a function that determines the orientation of the human body, it may create an unreasonable visual effect. In addition, if the smart full-length mirror uses the detection of the user's face as the determination of the orientation of the human body, the smart full-length mirror may be misled by the user's face, determining that the human body is also front side, and the virtual clothes are still showing a frontal appearance. In this case, the visual effect will be unreasonable.

Therefore, how to determine the orientation of the user's body has become one of the problems to be solved in this field.

BRIEF SUMMARY OF THE INVENTION

In accordance with one feature of the present invention, the present disclosure provides a detection device for detecting human-body orientation. The detection device includes a camera and a processing device. The camera is configured to capture a human-body image. The processing device is configured to cut a human head contour image in the human-body image to obtain an input image, and input the input image to a classifier. The classifier outputs a plurality of human-body orientation probabilities for the input image. The processing device finds the highest human-body orientation probability, and determines whether the highest human-body orientation probability is above the accuracy threshold. In response to the highest human-body orientation probability being above the accuracy threshold, the processing device regards the human-body orientation corresponding to the highest human-body orientation probability as the determined human-body orientation.

In accordance with one feature of the present invention, the present disclosure provides a detection method for detecting human-body orientation. The detection method for detecting human-body orientation includes following steps: capturing a human-body image with a camera; and cutting a human head contour image in the human-body image to obtain an input image, and inputting the input image to a classifier; wherein the classifier outputs a plurality of human-body orientation probabilities for the input image; finding the highest human-body orientation probability, and determining whether the highest human-body orientation probability is above the accuracy threshold; if so, the human-body orientation corresponding to the highest human-body orientation probability is regarded as the determined human-body orientation.

The detection device for detecting human-body orientation and the detection method for detecting human-body orientation shown in the embodiment of the present invention can accurately determine the human-body orientation. The determination of the human-body orientation described in the present invention is, for example, the front, the left side, the right side, or the back of the human body, so that the smart full-length mirror can more accurately apply the virtual clothes to the human-body image. Even if the user is turned sideways and turned the user's head straight (towards the smart full-length mirror), that is, facing the smart full-length mirror, the user can still see the reasonable try-on results in the smart full-length mirror, thereby improving a good user experience. In addition, the detection device for detecting human-body orientation and the detection method for detecting human-body orientation shown in the embodiment of the present invention can also send the data output by the smart full-length mirror to another server to calculate the usage rate of the smart full-length mirror or use the data as analysis to achieve other purposes.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
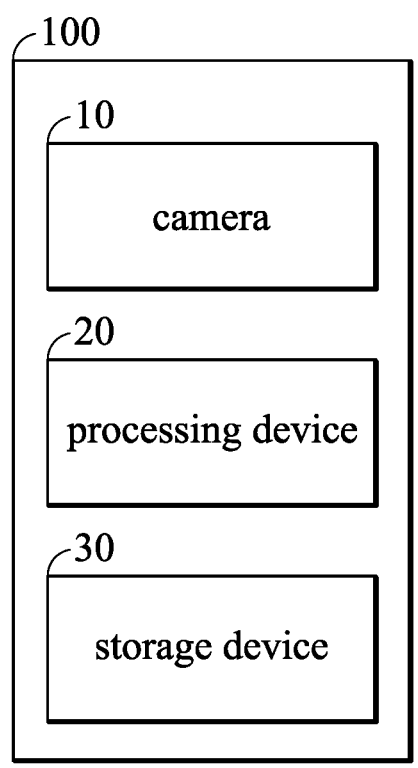
FIG. 1 is a block diagram of a detection device for detecting the human-body orientation in accordance with one embodiment of the present disclosure.
Figure 2:
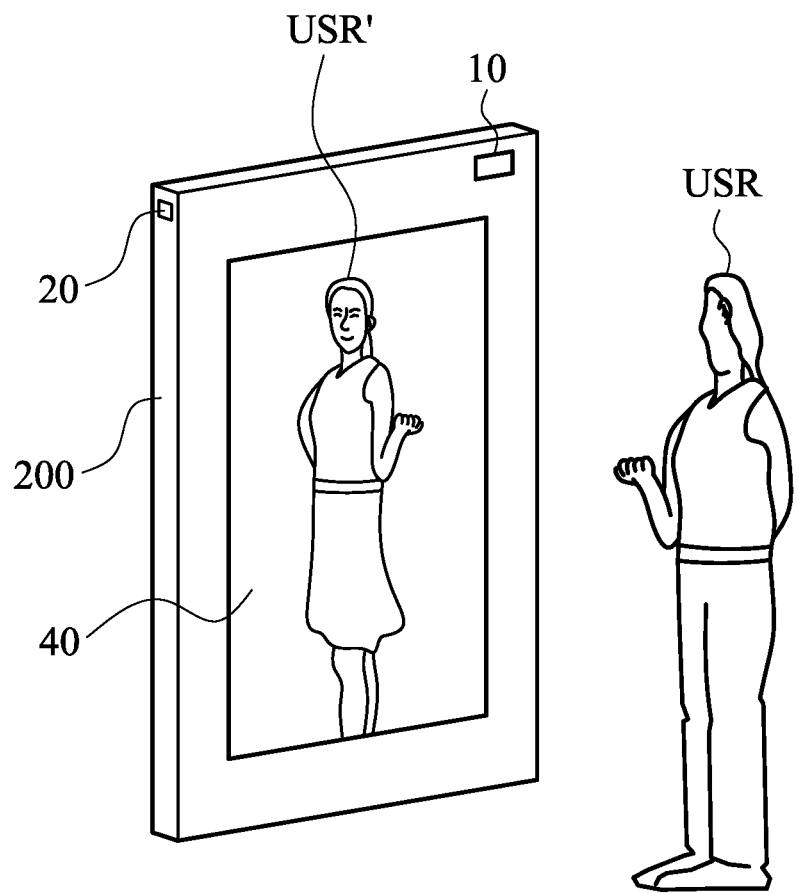
FIG. 2 is a schematic diagram of a detection device for detecting the human-body orientation applied to a smart full-length mirror in accordance with one embodiment of the present disclosure.
Figure 3A:
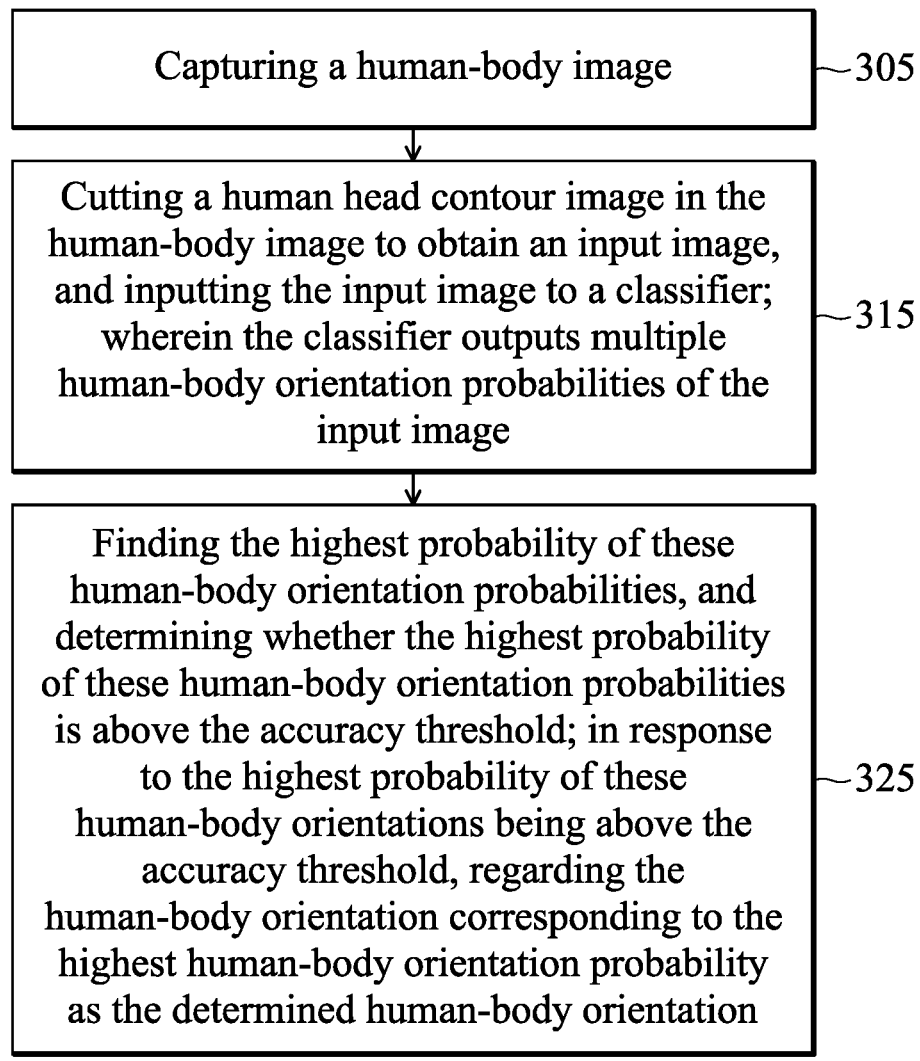
FIGS. 3A-3B are block diagrams of a detection method for detecting the human-body orientation in accordance with one embodiment of the present disclosure.
Figure 3B:
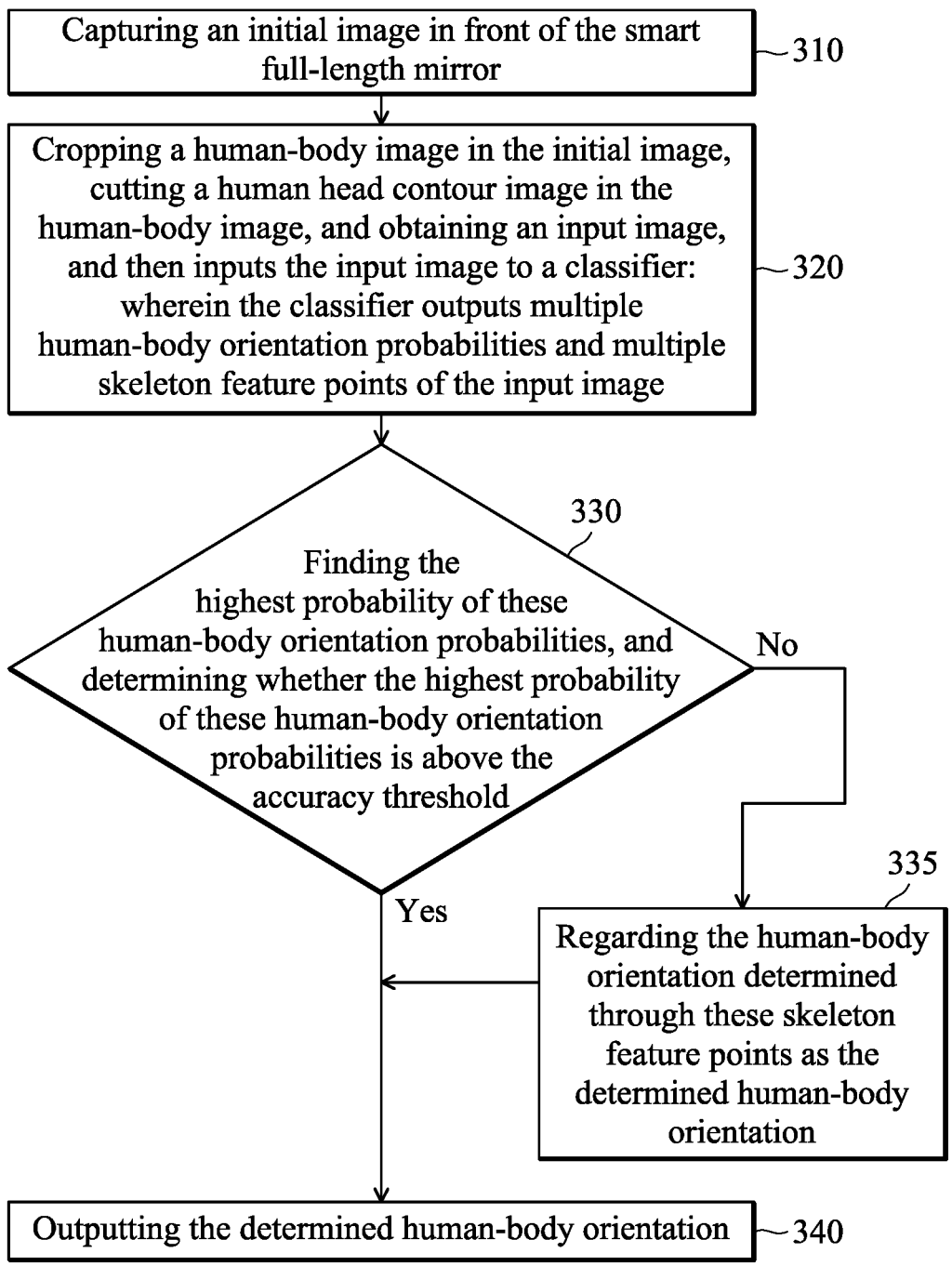

Please refer to FIGS. 1 and 3A to 3B, FIG. 1 is a block diagram of a detection device 100 for detecting the human-body orientation in accordance with one embodiment of the present disclosure. FIG. 2 is a schematic diagram of a detection device 100 for detecting the human-body orientation applied to a smart full-length mirror 200 in accordance with one embodiment of the present disclosure. FIG. 3A is a block diagram of a detection method 300 for detecting the human-body orientation in accordance with one embodiment of the present disclosure. FIG. 3B is a block diagram of a detection method 350 for detecting the human-body orientation in accordance with one embodiment of the present disclosure.

In one embodiment, the detection device 100 for detecting the human-body orientation is suitable for the smart full-length mirror 200, and the detection device 100 for detecting the human-body orientation includes a camera 10 and a processing device 20. In one embodiment, the camera 10 may be composed of at least one charge coupled device (CCD) or a complementary metal-oxide semiconductor (CMOS) sensor.

In one embodiment, the camera 10 is disposed on the smart full-length mirror 200 for capturing images in front of the smart full-length mirror 200. In one embodiment, the camera 10 is arranged at the periphery of the display 40 of the smart full-length mirror 200, for example, the camera 10 is arranged at the upper right corner, directly above the middle or the upper left corner of the display 40.

In one embodiment, the processing device 20 includes a processor and/or a graphics processing unit (GPU).

In one embodiment, the processing device 20 can be implemented by a micro controller, a microprocessor, a digital signal processor, an application specific integrated circuit (ASIC), or a logic circuit.

In one embodiment, the processing device 20 can be implemented by a Raspberry Pi. Raspberry Pi can be regarded as a small computer. Raspberry Pi is inexpensive, easy to obtain, convenient to carry, simple to install, stable in operation, and can be connected to other peripheral devices. Therefore, Raspberry Pi can be installed in the smart mirror 200. In one embodiment, the Raspberry Pi includes a storage space.

In one embodiment, the Raspberry Pi can implement all the operations in the detection method 300 for detecting the human-body orientation and the detection method 350 for detecting the human-body orientation, so that all operations can be performed on the local end of the smart full-length mirror 200.

In one embodiment, when the amount of calculations is large and the Raspberry Pi cannot quickly process all the calculations, the Raspberry Pi can send data to a server. This server can be a remote server with better computing performance. This server will compute and return the computing result to the Raspberry Pi.

In one embodiment, the detection device 100 for detecting the human-body orientation further includes a storage device 30. The storage device 30 can be implemented as a read-only memory, flash memory, floppy disk, hard disk, optical disk, flash drive, tape, a database that can be accessed by the network, or those familiar with this technique can easily think of storage media with the same functions.

In one embodiment, the processing device 20 can execute the detection method 300 for detecting the human-body orientation or the detection method 350 for detecting the human-body orientation on the local end of the smart full-length mirror 200, and return the obtained result (that is, the determination of the human-body orientation, the determined human-body orientation, for example, the front of the body, the left side of the body, the right side of the body, and the back of the body) to the server. The server can use the received results for other applications, such as data analysis.

In one embodiment, as shown in FIG. 2, when the user USR walks in front of the smart full-length mirror 200, the camera 10 can capture the user USR, and the display 40 of the smart full-length mirror 200 can be a touch screen. The user USR selects clothes to wear through the touch screen, and the processing device 20 can use a known method, such as Augmented Reality (AR), for displaying the virtual reality image USR' that the virtual clothes applied to the user USR on the display 40. Augmented reality is a technology that calculates the position and angle of the image captured by the camera 10 and adds image-analysis technology, so that the virtual clothes on the display 40 can be combined with the real scene (for example, the user USR), so that the virtual reality image USR' that the virtual clothes applied to the user USR is displayed on the display 40. For example, the user USR wears pants in real life, and the user USR selects the skirt to wear through the interface of the display 40. Through the augmented reality technology, the display 40 can display the image of the user wearing the virtual skirt USR'. However, this is only an example, and this case is not limited to implement by the augmented reality methods.

In one embodiment, the user USR can select the clothes to wear in a variety of ways, such as scanning the QR code of the clothes tag, selecting from a touch screen, or other physical or virtual input interfaces.

Please refer to FIG. 3A, in step 305, the camera 10 captures a human-body image. In step 315, the processing device 20 cuts a human head contour image in the human-body image IMG1 to obtain an input image IMG2, and inputs the input image IMG2 to a classifier, and the classifier outputs multiple human-body orientation probabilities of the input image IMG2. In step 325, the processing device 20 finds the highest probability of these human-body orientation probabilities, and determines whether the highest probability of these human-body orientation probabilities is above the accuracy threshold. In response to the highest probability of these human-body orientations being above the accuracy threshold, the processing device 20 regards the human-body orientation corresponding to the highest human-body orientation probability as the determined human-body orientation.

The following further uses FIG. 3B to illustrate the detection method 350 for detecting human-body orientation in present invention.

In step 310, the camera 10 captures an initial image IMG0 in front of the smart full-length mirror 200. For example, as shown in FIG. 2, the camera 10 captures the user USR in front of the smart full-length mirror 200, and the captured user image is regarded as the initial image. However, this is only an example. The present invention is not limited to placing the camera 10 on the smart full-length mirror 200, nor is it limited to capturing an initial image IMG0 in front of the smart full-length mirror 200. The camera 10 only needs to capture a human-body image to apply the detection method 350 for detecting the human-body orientation of the present invention.

In step 320, the processing device 20 crops a human-body image IMG1 in the initial image IMG0, cuts a human head contour image in the human-body image IMG1, and obtains an input image IMG2, and then inputs the input image IMG2 to a classifier, and the classifier outputs multiple human-body orientation probabilities and multiple skeleton feature points of the input image IMG2.

Figure 4:
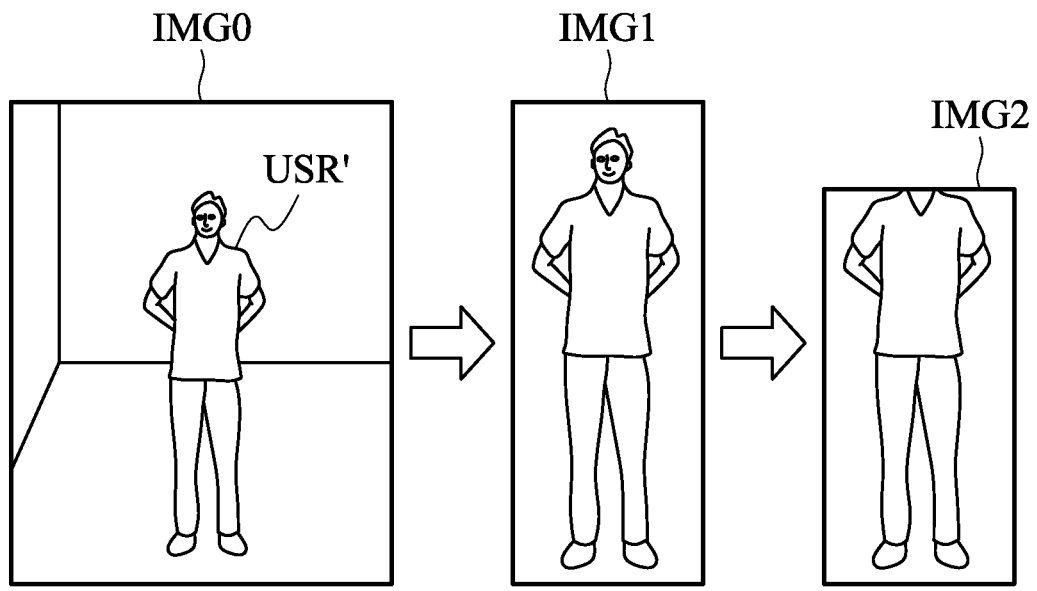
FIG. 4 is a schematic diagram of obtaining an input image in accordance with one embodiment of the present disclosure.
Figure 5:
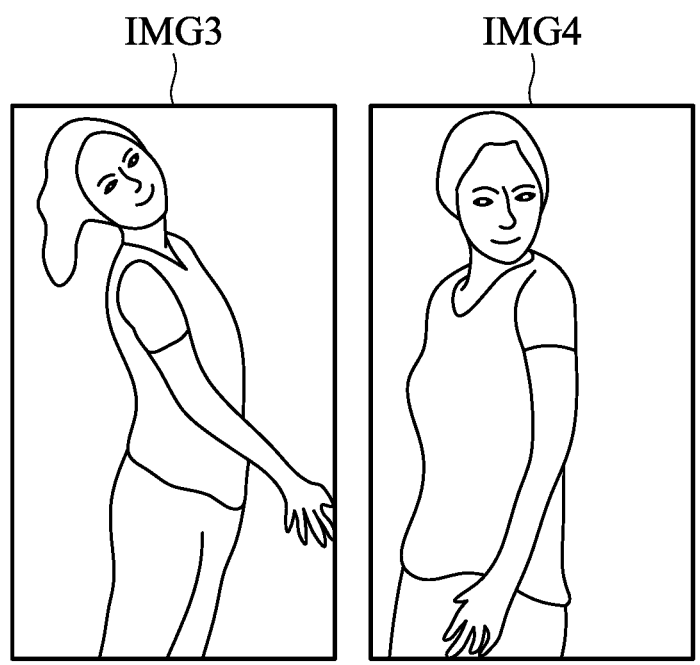
FIG. 5 is a schematic diagram of human-body images in accordance with one embodiment of the present disclosure.

Please refer to FIGS. 4 to 5. FIG. 4 is a schematic diagram of obtaining an input image IMG2 in accordance with one embodiment of the present disclosure. FIG. 5 is a schematic diagram of human-body images IMG3 to IMG4 in accordance with one embodiment of the present disclosure.

In one embodiment, after the camera 10 is set up, the processing device 20 uses the face and head shape (the contour of the head) to detect whether there is a user image USR' in the initial image IMG0 captured by the camera 10. If yes, the processing device 20 crops the human-body image IMG1 (the human-body image IMG1 is the user image USR').

In one embodiment, the processing device 20 can use other trained convolutional neural networks (CNN), feature point algorithms, or other known face recognition methods to find faces, and/or head shape (the contour of the head).

Generally speaking, when the user USR is looking at the smart full-length mirror 200, even if the user USR is standing sideways, the user USR will look in the orientation of the mirror. As shown in the human-body image IMG3 and the human-body image IMG4 in FIG. 5, the human-body image IMG3 and the human-body image IMG4 have faces facing the front. However, the human-body orientation of the human-body image IMG3 is toward the right side of the image, and the human-body orientation of the human-body image IMG4 is toward the left side of the image. If the orientation of the human body is determined based on the image of the human face, the determination of the human-body orientation will be inaccurate under these circumstances.

Therefore, in FIG. 4, the processing device 20 cuts out the human head contour image (or face image) in the human-body image IMG1 to obtain the input image IMG2. By inputting the image IMG2, the effect of determining the orientation of the human body can be achieved to prevent the processing device 20 from being affected by the head contour image (or face image) when determining the human-body orientation.

In some examples, the processing device 20 can firstly frame the image of the contour of the human head (or the image of the human face), and then perform cutting the human head (or the image of the human face) in the image.

In some examples, the processing device 20 first determines whether the orientation of the human body is the back according to all or part of the image of the human face before cropping the image of the human head contour. The processing device 20 determines that there is no human face in the human head contour image in the human-body image, and then determines that the human-body orientation is the back of the human body.

Next, the processing device 20 inputs the input image IMG2 to a classifier, and the classifier outputs multiple human-body orientation probabilities and multiple skeleton feature points of the input image.

Figure 6:
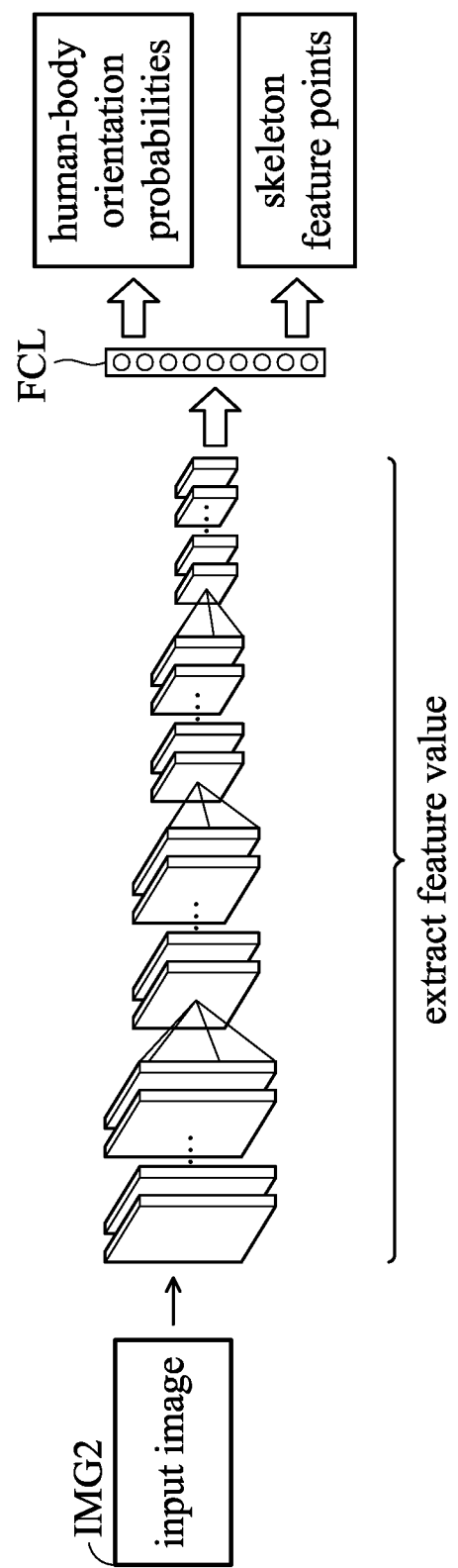
FIG. 6 is a schematic diagram illustrating a classifier operation method in accordance with one embodiment of the present disclosure.

Please refer to FIG. 6, which is a schematic diagram illustrating a classifier operation method in accordance with one embodiment of the present disclosure.

In one embodiment, as shown in FIG. 6, the classifier is implemented by a convolutional neural network. After the convolutional neural network receives the input image IMG2 in the training stage, it will extract feature values layer by layer.

In one embodiment, during the training stage of the convolutional neural network, the human-body orientation probabilities and the recognition accuracy of multiple skeleton feature points are trained separately for multiple input images. The processing device 20 first inputs the manually labeled image and the real orientation data and real feature-point position data of the corresponding image into the convolutional neural network for training.

Then, the convolutional neural network outputs multiple human-body orientation probabilities and multiple skeleton feature points (these parameters are represented by hollow circles) in a fully connected layer (FCL). The processing device 20 calculates the regression loss from these human-body orientation probabilities and the real orientation data, and calculates the Euclidean distance loss from the skeleton feature points and a plurality of real feature-point position data. The processing device 20 then sums the regression loss and the Euclidean distance loss into a total loss, uses the back-propagation method to adjust the parameters or weights of the convolutional neural network and transmits them back to the convolutional neural network to continue training, so that the total loss gradually decreases and approaches a certain value. The algorithm of Euclidean distance is: $d(x, y) := \sqrt{(x_1-y_1)^2+(x_2-y_2)^2+\ldots+(x_n-y_n)^2}$.

Euclidean distance is used to calculate the distance between two points, because the final output of the CNN architecture is the probability of each orientation of the human body and the coordinates of each skeleton feature point. The coordinates of each skeleton feature point can be known by the distance algorithm to know how much error is from the real feature-point position, and the error of the probability of each orientation of the human body and the real orientation is calculated by the algorithm of logistic regression. The logistic regression algorithm is:

$$(w, b) = \frac{1}{m}\sum_{i=1}^{m} \mathcal{L}(\hat{y}^{(i)}, y^{(i)}).$$

There are two "y" in the logistic regression algorithm, one is the probability of CNN architecture determination, the other is the real probability, the symbol "m" represents the orientation (the number of orientations), the "m" in this logistic regression algorithm is 4 (four orientations). For example, the probability of each orientation determined by the model may be (0.64, 0.03, 0.32, 0.1), but the real probability of the orientation (there is only one orientation in the real orientation) is (1, 0, 0, 0), these values are substituted into the formula calculation. In the first orientation (when m=1), the processing device 20 substitute two "y" into 0.64 and 1 to calculate. The calculation in other orientations can be deduced by analogy.

In one embodiment, these human-body orientation probabilities correspond to a plurality of feature vectors output by the convolutional neural network. For example, the feature vector of the front of the body, the feature vector of the left side body, the feature vector of the right side body, and the feature vector of the back of the body. For example, the convolutional layer outputs multiple feature vectors, performs pooling operations on each feature vector, and then performs feature vector splicing. Finally, through the activation function (softmax) operation in the fully connected layer, the human-body orientation probabilities of multiple corresponding feature vectors are obtained.

In one embodiment, the probabilities of human-body orientation are a frontal side probability of the human body (for example, 97%), a left-side body probability (for example, 1%), a right-side body probability (for example, 0%), and a backside probability (for example, 2%). The processing device 20 first determines that the person with the highest probability of human-body orientation (i.e., the frontal probability of the human body is 97%), and then calculates the regression loss based on the corresponding human-body orientation (i.e., the frontal probability of the human body) and the real orientation data.

Figure 7:
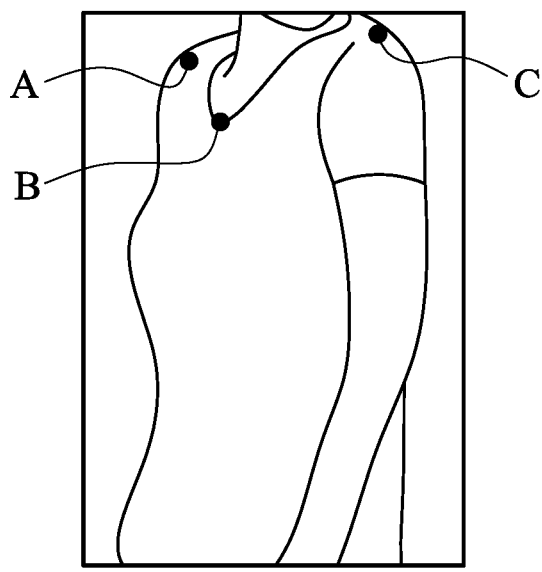
FIG. 7 is a schematic diagram of a skeleton feature point according to an embodiment of the present invention in accordance with one embodiment of the present disclosure.

Please refer to FIG. 7, which is a schematic diagram of a skeleton feature point according to an embodiment of the present invention in accordance with one embodiment of the present disclosure.

In one embodiment, the real feature-point position of the skeleton is a set of three sets of coordinates. The real feature-point position can be manually labeled on the input image IMG2, and the labeled coordinates are sequentially input to the convolutional neural network. For example, as shown in FIG. 7, the real feature-point positions are entered in order from left to right for the coordinates of the real feature point A of the left shoulder, the coordinates of the real feature point B of the collar (chest), and the coordinates of the real feature point C of the right shoulder. The expression can be: {[105,142], [131,195], [270,144]}, the real feature-point position and the input image IMG2 are input into the convolutional neural network for training. In addition to inputting real orientation data to train convolutional neural network, the real feature point coordinate data is also inputted into convolutional neural network training together, which will make the convolutional neural network more accurately determine the orientation of the human body.

In one embodiment, when the processing device 20 inputs the input image IMG2 into the convolutional neural network, the skeletal feature points output by the convolutional neural network will also have the same order (for example, from left to right), and output the coordinates of a left shoulder feature point A', the coordinates of a chest feature point B', and the coordinates of a right shoulder feature point C'. In one embodiment, the skeleton feature points include left shoulder feature point coordinates, right shoulder feature point coordinates, and chest feature point coordinates.

In one embodiment, since the skeleton feature points output by the convolutional neural network in the fully connected layer FCL already include coordinates, the processing device 20 can calculate the Euclidean distance loss based on the location data of the skeleton feature points and the real feature points.

Then, the processing device 20 uses the back-propagation method to adjust the neuron, weight, number of layers and other parameters, and then trains the convolutional neural network until the total loss is less than a total loss threshold, which indicates that the convolutional neural network has been trained. When the total loss is lower than the total loss threshold, there is little difference between the multiple human-body orientation probabilities and multiple skeleton feature points output by the convolutional neural network, and the real orientation data and the real feature point location data that are manually labeled. At this time, the convolutional neural network can determine the human-body orientation in various input images.

In one embodiment, the classifier can be a convolutional neural network program stored in the storage device 30, and the processing device 20 can read and execute the classifier.

In one embodiment, when the processing device 20 is implemented by a Raspberry Pi, the classifier can be a convolutional neural network program stored in the storage space of the Raspberry Pi. The processor in the Raspberry Pi can read the classifier in the storage space and execute it.

In one embodiment, the classifier can be implemented by a hardware circuit.

In step 330, the processing device 20 finds the highest probability of these human-body orientation probabilities, and determines whether the highest probability of these human-body orientation probabilities is above the accuracy threshold.

In response to the highest probability of these human-body orientation probabilities being above the accuracy threshold, the processing device 20 regards the human-body orientation corresponding to the highest probability of these human-body orientation probabilities as determined human-body orientation, and the step 340 is performed.

In one embodiment, the probabilities of human-body orientation are a frontal body probability (for example, 97%), a left-side body probability (for example, 1%), a right-side body probability (for example, 0%), and a backside probability (for example, 2%), the processing device 20 determines whether the largest of these human body orientation probability values (i.e., the human body frontal probability 97%) is above the accuracy threshold. If the accuracy threshold is 70%, the frontal body probability is 97% above the accuracy threshold, the processing device 30 regards the front of the human body as the determined human-body orientation, and the processing device 20 executes step 340.

In one embodiment, after the orientation of the human body is determined, the smart full-length mirror can apply virtual clothes to the human-body image more accurately, allowing the user USR to see the images of him/her wearing virtual clothes corresponding to different body angles.

In step 340, the processing device 20 outputs the determined human-body orientation. In another embodiment, the processing device 20 calculates the determined human-body orientation to obtain the user's usage-habit information. In one embodiment, the processing device 20 transmits the determined human-body orientation to other modules stored in the Raspberry Pi or server, such as an augmented-reality module, a virtual clothes presentation module, etc., so as to let the user see the images of wearing the virtual clothes or the images of wearing virtual products corresponding to different body angles. In one embodiment, the display 40 includes a display module and an augmented-reality module. After the processing device 20 transmits the determined human-body orientation to the augmented-reality module, the augmented-reality module combines the human-body image captured by the camera 10 with a virtual product according to the determined human-body orientation to generate a combined image, and displays the combined image on the display 40 through the display module.

On the other hand, in step 330, the processing device 20 executes step 335 in response to the processing device determining that the highest probability of these human-body orientation probabilities is below the accuracy threshold.

In one embodiment, the human-body orientation probabilities are a frontal body probability (for example, 64%), a left-side body probability (for example, 3%), a right-side body probability (for example, 32%), and a backside body probability (for example, 1%), the processing device 20 determines whether the largest of these human-body orientation probabilities (i.e., the human body frontal probability of 64%) is above the accuracy threshold. If the accuracy threshold is 70%, then a frontal body probability of 64% is below the accuracy threshold. This means that the human-body orientation output by the classifier does not have a clear bias, and more detailed judgments need to be made through the skeleton feature points. Therefore, the processing device 20 executes step 335.

In other words, in response to the greatest probability of the human-body orientation being below the accuracy threshold, the processing device 20 regards the human-body orientation determined through the skeleton feature points as a confirmed human-body orientation (step 335).

In step 335, the human-body orientation determined by the processing device 20 through these skeleton feature points is regarded as the determined human-body orientation.

Figure 8A:
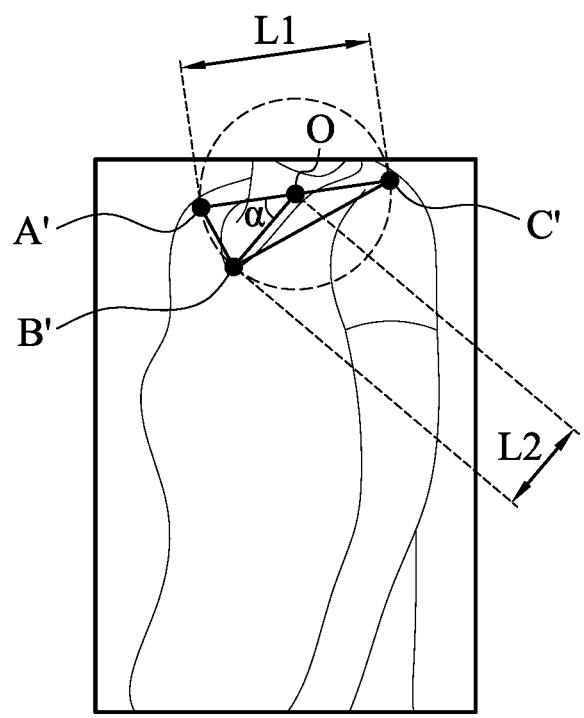
FIGS. 8A-8B are schematic diagrams illustrating a method for determining the orientation of human-body orientation through skeleton feature points in accordance with one embodiment of the present disclosure.
Figure 8B:
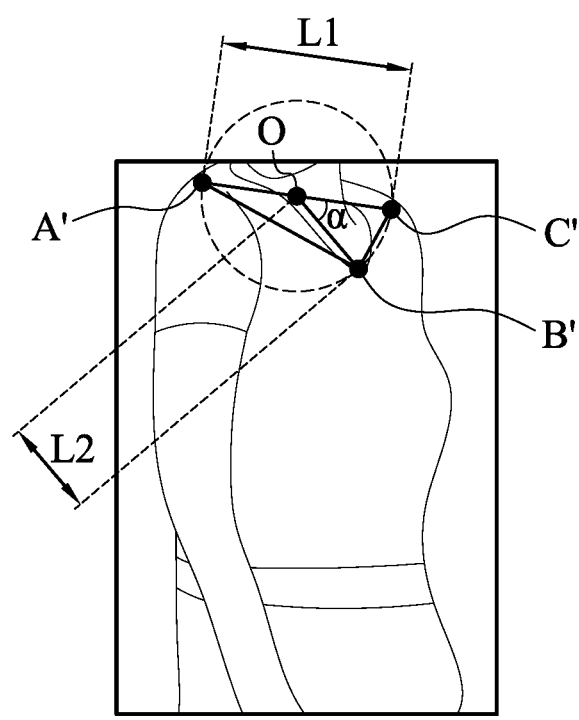

Please refer to FIG. 8A to 8B, FIGS. 8A to 8B are schematic diagrams illustrating a method for determining the orientation of human-body orientation through skeleton feature points in accordance with one embodiment of the present disclosure.

The skeleton feature points in FIGS. 8A to 8B are output by the classifier, which are, in order, the coordinates of a left shoulder feature point A', the coordinates of a chest feature point B', and the coordinates of a right shoulder feature point C'.

In one embodiment, the processing device 20 connects a first straight line L1 between the left shoulder feature point coordinates A' and the right shoulder feature point coordinates C', and regards the middle point of the first straight line L1 as the circle center O. Then, through the circle center O and the half length of the first straight line L1 as the radius (that is, the length from the center O to the left shoulder feature point coordinates A' is the radius), a circle is drawn. In addition, a second straight line L2 is formed by connecting the coordinates of the chest feature point B' and the circle center O, and the angle between the second straight line L2 and the circle center O is calculated. Among the two included angles, an angle α of less than 90 degrees is selected to determine the orientation of the human body. In another embodiment, the processing device 20 further determines whether the two included angles are less than an angle threshold, where the angle threshold is an angle of less than 90 degrees and greater than 0 degrees. In one embodiment, the angle threshold is set to 45 degrees. If one of the two included angles is less than 45 degrees, and the included angle is on the left side of the first straight line L1, it is determined that the determined human-body orientation is the left side. If an included angle is less than 45 degrees, and the included angle is located on the right side of the first straight line L1, it is determined that the determined human-body orientation is the right side, and if both included angles are greater than 45 degrees, it is determined that the determined human-body orientation is the front side. The angle threshold is, for example, 80 degrees, 45 degrees, 60 degrees, or 30 degrees, and is designed according to requirements.

In one embodiment, the processing device 20 can rotate the first straight line L1 to a horizontal position and rotate the three coordinates together to facilitate calculation and confirmation of the included angle α on the left or right side of the first straight line L1, for example, to calculate whether the included angle α is less than 90 degrees.

In one embodiment, when the processing device 20 determines that the included angle α is equal to 90 degrees, it means that the determined human-body orientation is determined to be the front of the human body.

In one embodiment, as shown in FIG. 8A, the processing device 20 determines that an included angle α of less than 90 degrees is located on the left side of the first straight line L1, and then determines that the human-body orientation is the left side body. In another embodiment, the processing device 20 further determines whether the included angle α which is less than 90 degrees is less than 45 degrees. If the included angle α is less than 45 degrees, and the included angle is located on the left side of the first straight line L1, it is determined that the determined human-body orientation is the left side body. If the included angle α is less than 45 degrees, and the included angle is located on the right side of the first straight line L1, it is determined that the determined human-body orientation is the right side body. If the included angle α is greater than 45 degrees, it is determined that the determined human-body orientation is front side.

In one embodiment, as shown in FIG. 8A, the processing device 20 determines that the included angle α of less than 90 degrees is located on the left side of the first straight line L1, and the included angle α is less than 45 degrees, it is determined that the determined human-body orientation is the left side. In one embodiment, connecting left shoulder feature point A' and chest feature point B' is the edge corresponding to the included angle α of less than 90 degrees, and the corresponding edge is located to the relative left of the circle center O, then the processing device 20 determines that the determined human-body orientation is the left side body.

In one embodiment, as shown in FIG. 8B, the processing device 20 determines that an included angle of less than 90 degrees is located on the right side of the first straight line L1, and if the included angle α is less than 45 degrees, then the processing device 20 determines that the determined human-body orientation is the right side body. In one embodiment, connecting the right shoulder feature point C' and the chest feature point B' is the edge corresponding to the included angle α of less than 90 degrees, and the corresponding edge is located to the relative right of the circle center O, and the processing device 20 determines that the determined human-body orientation is the right side body.

In one embodiment, the processing device 20 extracts the human-body image IMG1 from the initial image IMG0, and determines whether there is a human face in the head contour image in the human-body image IMG1. In response to the processing device 20 determining that there is no face in the head contour image in the human-body image IMG1, it is determined that the determined human-body orientation is the back of the human body.

It can be seen from the above that the classifier is a multi-task architecture, and two things can be completed with the same architecture, such as a convolutional neural network architecture, which can greatly reduce the resources used by the processing device 20 (for example, implemented with Raspberry Pi). In response to the human body is in a clear sideways position, the convolutional neural network can output a clear (above the accuracy threshold) human-body orientation probability, and the human-body orientation corresponding to this human body probability can be regarded as the determined human-body orientation. However, in response to the human body is in an inconspicuous sideways position, the probability of all human-body orientations output by the convolutional neural network is not above the accuracy threshold. In this case, the detection device 100 for detecting the human-body orientation uses the skeleton feature points to calculate the included angle α more accurately through the positions of the shoulders and the chest, and determines the determined human-body orientation through the position of the included angle α.

The detection device for detecting human-body orientation and the detection method for detecting human-body orientation shown in the embodiment of the present invention can accurately determine the human-body orientation. The determination of the human-body orientation described in the present invention is, for example, the front, the left side, the right side, or the back of the human body, so that the smart full-length mirror can more accurately apply the virtual clothes to the human-body image. Even if the user is turned sideways and turned the user's head straight, that is, facing the smart full-length mirror, the user can still see the reasonable try-on results in the smart full-length mirror, thereby improving a good user experience. In addition, the detection device for detecting human-body orientation and the detection method for detecting human-body orientation shown in the embodiment of the present invention can also send the data output by the smart full-length mirror to another server to calculate the usage rate of the smart full-length mirror or use the data as analysis to achieve other purposes.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A detection device for detecting human-body orientation, comprising:
   a camera, configured to capture a human-body image; and
   a processing device, configured to cut a human head contour image in the human-body image to obtain an input image that does not include the head contour image, and input the input image to a classifier, wherein the classifier outputs a plurality of human-body orientation probabilities for the input image and a plurality of skeleton feature points of the input image;
   wherein the processing device finds the highest human-body orientation probability, and determines whether the highest human-body orientation probability is above an accuracy threshold;
   in response to the highest human-body orientation probability being above the accuracy threshold, the processing device regards the human-body orientation corresponding to the highest human-body orientation probability as a determined human-body orientation;
   in response to the highest human-body orientation probability being below the accuracy threshold, the processing device regards the human-body orientation determined through the skeleton feature points as the determined human-body orientation.

2. The detection device for detecting the human-body orientation of claim 1, wherein the classifier is implemented by a convolutional neural network (CNN);
   after the convolutional neural network receives the input image in the training stage, the convolutional neural network outputs the human-body orientation probabilities and skeleton feature points in the fully connected layer, calculates a regression loss with the human-body orientation corresponding to the highest human-body orientation probability and real orientation data, and calculates a Euclidean distance loss with the skeleton feature points and a plurality of real feature-point position data, then adds the regression loss and the Euclidean distance loss to get a total loss, and adjusts the parameters of the convolutional neural network using a back-propagation method to retrain the convolutional neural network, so that the calculated total loss after each training becomes smaller;
   wherein the human-body orientation probabilities correspond to a plurality of feature vectors output by the convolutional neural network.

3. The detection device for detecting the human-body orientation of claim 1, wherein the human-body orientation probabilities are respectively a frontal body probability, a left-side body probability, a right-side body probability, and a backside body probability.

4. The detection device for detecting the human-body orientation of claim 1, wherein the skeleton feature points further comprise left shoulder feature point coordinates, right shoulder feature point coordinates, and chest feature point coordinates.

5. The detection device for detecting the human-body orientation of claim 4, wherein the processing device connects a first straight line between the left shoulder feature point coordinates and the right shoulder feature point coordinates, regards a middle point of the first straight line as a circle center, connects the chest feature point coordinates and the circle center to form a second straight line, calculates an angle of an included angle between the second straight line and the circle center, and select the included angle below an angle threshold to determine the determined human-body orientation;
    wherein the angle threshold is an angle of less than 90 degrees and greater than 0 degrees.

6. The detection device for detecting the human-body orientation of claim 5, wherein in response to the processing device determines that the included angle is equal to 90 degrees, this means that the determined human-body orientation is the front of the human body;
    wherein the processing device further determines:
    whether the included angle is less than or equal to the angle threshold, in response to the included angle being less than or equal to the angle threshold, and the included angle being located on the left side of the first straight line, the determined human-body orientation is the left side body;
    whether the included angle is less than or equal to the angle threshold, in response to the included angle being less than or equal to the angle threshold, and the included angle being located on the right side of the first straight line, the determined human-body orientation is the right side body; and
    in response to the processing device determines that the included angles are all greater than the angle threshold, the determined human-body orientation is the front of the human body.

7. The detection device for detecting the human-body orientation of claim 1, wherein the processing device determines whether there is a human face in the human head contour image in the human-body image;
    in response to the processing device determining that there is no face in the head contour image in the human-body image, the determined human-body orientation is the back of the human body.

8. The detection device for detecting the human-body orientation of claim 1, wherein the processing device counts the determined human-body orientation to obtain usage-habit information.

9. The detection device for detecting the human-body orientation of claim 1, further comprising:
    a display;
    wherein the display comprises a display module and an augmented-reality module;
    wherein the processing device transmits the determined human-body orientation to the augmented-reality module, the augmented-reality module combines the human-body image with a virtual product according to the determined human-body orientation to generate a combined image, and displays the combined image on the display through the display module.

10. A detection method for detecting human-body orientation, comprising:
    capturing a human-body image using a camera;
    cutting a human head contour image in the human-body image to obtain an input image that does not include the head contour image, and inputting the input image to a classifier; wherein the classifier outputs a plurality of human-body orientation probabilities for the input image and a plurality of skeleton feature points of the input image;
    finding the highest human-body orientation probability, and determining whether the highest human-body orientation probability is above an accuracy threshold; and
    in response to the highest human-body orientation probability being above the accuracy threshold, regarding the human-body orientation corresponding to the highest human-body orientation probability as a determined human-body orientation;
    in response to the highest human-body orientation probability being below the accuracy threshold, regarding the human-body orientation determined through the skeleton feature points as the determined human-body orientation.

11. The detection method for detecting the human-body orientation of claim 10, wherein the classifier is implemented by a convolutional neural network (CNN);
    after the convolutional neural network receives the input image in the training stage, the convolutional neural network outputs the human-body orientation probabilities and skeleton feature points in the fully connected layer, calculates the regression loss with the human-body orientation corresponding to the highest human-body orientation probability and real orientation data, and calculates the Euclidean distance loss with the skeleton feature points and a plurality of real feature-point position data, then adds the regression loss and the Euclidean distance loss to get the total loss, and adjusts the parameters of the convolutional neural network using a back-propagation method to retrain the convolutional neural network, so that the calculated total loss after each training becomes smaller;
    wherein the human-body orientation probabilities correspond to a plurality of feature vectors output by the convolutional neural network.

12. The detection method for detecting the human-body orientation of claim 10, wherein the human-body orientation probabilities are respectively a frontal body probability, a left-side body probability, a right-side body probability and a backside body probability.

13. The detection method for detecting the human-body orientation of claim 10, wherein the skeleton feature points further comprise left shoulder feature point coordinates, right shoulder feature point coordinates, and chest feature point coordinates.

14. The detection method for detecting the human-body orientation of claim 13, further comprising:
    connecting a first straight line between the left shoulder feature point coordinates and the right shoulder feature point coordinates, regarding the middle point of the first straight line as the circle center;
    connecting the chest feature point coordinates and the circle center to form a second straight line;
    calculating the angle of the included angle between the second straight line and the circle center; and
    selecting the included angle below an angle threshold to determine the determined human-body orientation;
    wherein the angle threshold is an angle of less than 90 degrees and greater than 0 degrees.

15. The detection method for detecting the human-body orientation of claim 14, wherein in response to the included angle is equal to 90 degrees, this means that the determined human-body orientation is the front of the human body;
    wherein in response to the included angle being less than or equal to the angle threshold, and the included angle is located on the left side of the first straight line, the determined human-body orientation is the left side body;
    wherein in response to the included angle being less than or equal to the angle threshold, and the included angle is located on the right side of the first straight line, the determined human-body orientation is the right side body; and in response to the included angles are all greater than the angle threshold, the determined human-body orientation is the front of the human body.

16. The detection method for detecting the human-body orientation of claim 10, further comprising:
determining whether there is a human face in the human head contour image in the human-body image;
in response to the processing device determining that there is no face in the head contour image in the human-body image, the determined human-body orientation is the back of the human body.

17. The detection method for detecting the human-body orientation of claim 10, further comprising:
counting the determined human-body orientation to obtain usage-habit information.

18. The detection method for detecting the human-body orientation of claim 10, further comprising:
transmitting the determined human-body orientation to an augmented-reality module;
combining the human-body image with a virtual product by the augmented-reality module according to the determined human-body orientation to generate a combined image; and
displaying the combined image on a display through a display module.

* * * * *